United States Patent [19]

Kelman

[11] Patent Number: 4,728,182
[45] Date of Patent: Mar. 1, 1988

[54] BI-FOCAL CONTACT LENS

[76] Inventor: Charles D. Kelman, North Shore Towers, 269 Grand Central Pkwy., Bldg. 3, Floral Park, N.Y. 11005

[21] Appl. No.: 801,604

[22] Filed: Nov. 25, 1985

[51] Int. Cl.[4] ............................................. G02C 7/04
[52] U.S. Cl. ................................. 351/161; 351/160 H
[58] Field of Search ............... 351/160 R, 160 H, 161, 351/162

[56] References Cited

U.S. PATENT DOCUMENTS 3,431,327 3/1969 Tsuetaki ...................... 351/161 X

FOREIGN PATENT DOCUMENTS 1423908 11/1965 France ................................. 351/161
895334 5/1962 United Kingdom ................ 351/161

Primary Examiner—John K. Corbin
Assistant Examiner—Scott J. Sugarman
Attorney, Agent, or Firm—Henry Sternberg

[57] ABSTRACT

A bi-focal contact lens having a first lens portion for distance viewing, a second lens portion for near viewing and capable of being shifted, on the eyeball, between a first position in which the first lens portion is seated and centered on the cornea and a second position in which the second lens portion is seated and centered on the cornea.

13 Claims, 7 Drawing Figures

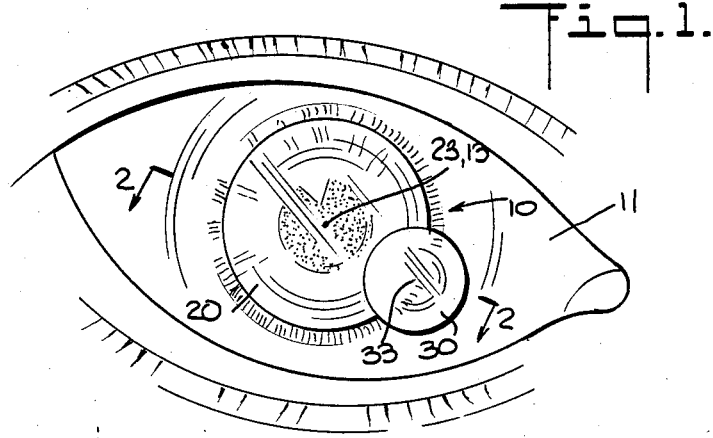
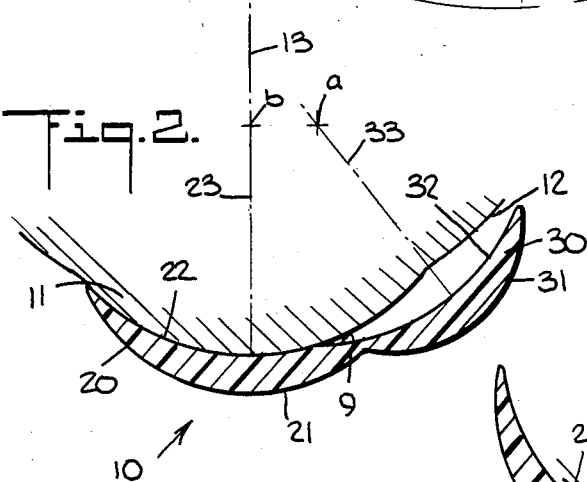
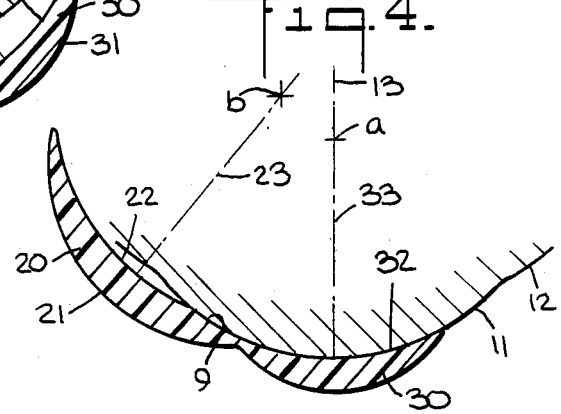
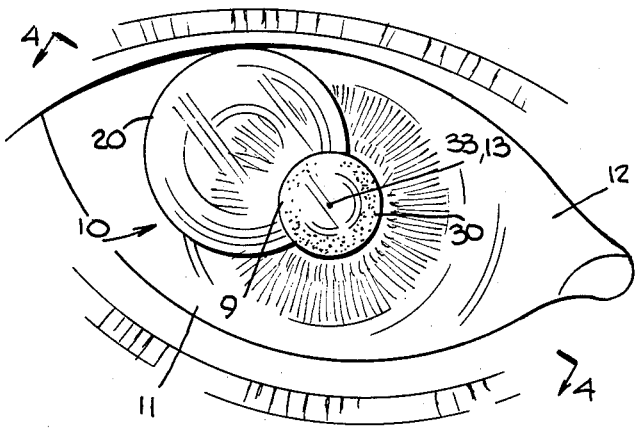

BI-FOCAL CONTACT LENS

BACKGROUND OF THE INVENTION

This invention relates to contact lenses and particularly to bi-focal contact lenses.

By the term bi-focal contact lens is meant a contact lens in which different portions of the lens are designed to have differing indices of refraction.

The eyeglass type bi-focal lenses have many advantages since a person wearing such glasses may readily see distant as well as close objects without changing glasses. Such lenses are, therefore, very popular.

Contact lenses, which eliminate the need for eyeglasses, are, of course, also very popular. These lenses, which cover a portion of the eyeball of the wearer, sit in virtually direct contact with the cornea, separated therefrom by only a thin film of fluid which covers the eyeball. The rear faces of such contact lenses are ground to correspond approximately with the curved contour of the cornea portion of the eyeball, while the front faces thereof are curved so as to give the desired optical effect. Typical modern contact lenses cover an area somewhat smaller than the cornea of the eye but considerably larger than the pupil of the eye and are kept in close overlying relation thereto.

Contact lenses have a number of advantages, the principal one being the close contact with the eye and relatively fixed position in use relative to the optical axis of the eye, which naturally results in better vision than is the case where the lenses are held in frames and the eyes look through different portions thereof. In other words, in contact lenses, the line of sight more nearly follows the optical center of the lens. Another advantage of contact lenses is their desirability from a cosmetic stand point and their greater safety in use than ordinary eye glasses in, for example, sporting activities and the like. Consequently, in recent years, many persons have come to prefer contact lenses over the ordinary eyeglass. While some attempts have been made to provide bi-focal contact lenses, until now, no one has been able to provide a practical bi-focal contact lens.

The ordinary bi-focal eyeglass lens is of this latter type since the wearer of the eye glasses only wishes the higher index or more highly refractive lens portion to be near the bottom of the lens where the glance will be when reading or doing other fine work. Thus, ordinarily, a person wearing a bi-focal lens wishes to use the long range vision portion of the lens most of the time and the reading or closeup portion thereof only when he is looking down.

Unlike the case with ordinary eyeglasses, there is no satisfactory known method of properly positionig a bi-focal contact lens on the eye so that it will function both as a distance lens and as a close-up lens while providing satisfactory vision in each.

One such known bi-focal contact lens is described in U.S. Pat. No. 3,279,878. This lens has a portion thereof with differing refractive index, sometimes referred to as the bi-focal segment of the lens, located in one sector or portion of the lens away from the geometric center thereof.

Such contact lenses were found to have several disadvantages. One is that the relatively thicker lower edge or bottom portion thereof was continuously being contacted by the eyelid. During blinking, if any rotational movement has started, for any reason, each further contact with the eyelid tends to aggravate the condition and cause the lens to rotate further. The principal objection, however, is that since the lens is positioned generally concentric with the optical axis, thus providing good distance vision, closeup material had to be viewed through a lens portion i.e., bi-focal segment, which was off-center with respect to the optical axis of the cornea and thus resulted in a substantial reduction in acuity.

Other known bi-focal contact lenses have been developed, such as the lens according to U.S. Pat. No. 3,431,327, which use an embedded metal weight for weighting the high index portion of the lens so as to properly orient it at all times. While such a construction may rotationally orient a contact lens about its optical axis and in fact is specifically designed for that purpose, the contact lens remains seated with its far vision segment in centered position i.e., in alignment with the optical axis of the cornea, so that when the eyeball moves down to reading position the contact lens moves with it. Thus, as noted above, closeup vision for reading or the like will always be along a line of sight which diverges from the optical axis of the cornea since such closeup viewing will be through a bi-focal segment located below such optical axis.

Accordingly, it is an object of the present invention to provide a bi-focal contact lens which will permit normal unobstructed vision for distance viewing while permitting clear and unobstructed vision for reading and other close viewing.

It is another object of the present invention to provide a bi-focal contact lens which, as a result of its novel construction, permits the wearer, with a minimum of effort, to shift from distance vision to near vision and vice-versa.

It is still another object of the present invention to provide a bi-focal contact lens which does not have the disadvantages of the known bi-focal contact lenses.

SUMMARY OF THE INVENTION

According to this invention there is provided a bi-focal contact lens comprising a first lens portion having a posterior surface curved to fit the cornea of a patient to which the lens is applied with a tendency for such first lens portion to remain centered thereon. The first lens portion is powered on the anterior surface thereof for distance vision with respect to the cornea of the patient. A second lens portion, integral with the first lens portion, has a posterior surface also curved to fit the cornea with a tendency for the second lens portion to remain centered thereon when it is applied to the cornea. The second lens portion is powered on the anterior surface thereof for near vision with respect to the cornea, and located with respect to the first lens portion such that part of the second lens portion extends into one quadrant of the first lens portion and the remainder of said second lens portion extends outwardly beyond the periphery of said first lens portion. The lens is adapted to be shifted on the eyeball between a first position in which the first lens portion is seated on and centered with respect to the cornea and a second position in which the second lens portion is seated on and centered with respect to the cornea.

BRIEF DESCRIPTION OF THE DRAWINGS

The above and other objects of the present invention will become more apparent when considered in conjunction with a description of the preferred embodiments of the present invention and as shown in the drawings, in which like reference numerals indicate corresponding parts throughout and in which:

FIG. 1 is a front elevational view of the contact lens according to the present invention in its positon of use on the eyeball of a person, for distance viewing;

FIG. 2 is a vertical sectional view of the contact lens of FIG. 1, taken in the direction of arrows 2—2, showing its relationship to the eyeball on which it is positioned for distance viewing;

FIG. 3 is a front elevational view of the contact lens of FIGS. 1 and 2 in its position of use, on the eyeball, for near viewing;

FIG. 4 is a vertioal sectional view of the contact lens of FIG. 3, taken in the direction of arrows 4—4, showing its relationship to the eyeball on which it is positioned for near viewing.

DETAILED DESCRIPTION OF THE INVENTION

Figure 6:
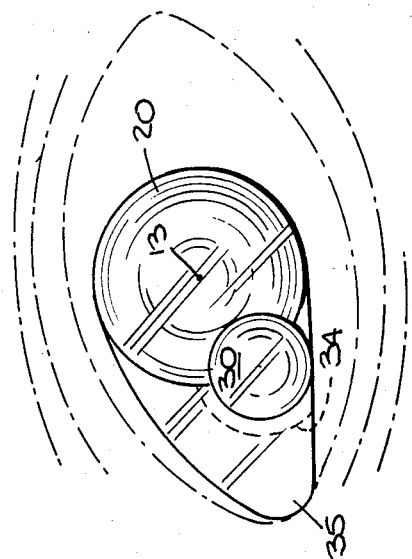
FIG. 6 is a front elevational view of a lens similar to the FIG. 5 embodiment of the present invention but for use on the left eye of a person.

Referring now to the drawings, the one-piece lens 10, shown in FIGS. 1 and 2, has a first optical portion 20 and a second optical portion 30, having a sharper outer curvature and consequently shorter focal length than the first optical portion 20. This is the reading segment of the lens while the first optical portion 20 which has a flatter outer cuvature than the curvature of the reading segment 30, is the distance segment of the lens.

As shown in FIGS. 2 and 4, the human cornea 11 has an approximately spherical outer surface. The anterior face 31 of the reading segment 30 has a sharper curvature and consequently shorter focal length than the spherical surface 21 of the anterior face of the first portion i.e. distance segment 20 of the lens. It will be understood that in making the contact lens the posterior face 22 of the first portion 20 and the posterior face 32 of the second portion 30 of the contact lens are each made spherical and made to match the curvature of the cornea.

Bi-focal segment 30 should, in use, preferably be located with its center below the axis 23 of the reading portion 20 of the lens. The posterior surfaces 22 and 32 of the first and second portions are formed such that each is parallel with the cornea curvature about their respective optical axes. Thus, the curvature of inner surface 32 of the reading portion is the same as the curvature of inner surface 22 of the distance portion 20.

The lenses herein disclosed may be made by conventional methods from the same suitable plastic, transparent materials (which are non-toxic and have the desired refracting characteristics), such as are currently used for the so-called "soft" contact lenses. An example of this material is the material used in the contact lenses marketed under the name "Permalens" by Cooper Vision, Inc., designated as Ter-Polymer of 2 hydroxy ethyl methacrylate n-vinyl, 2 pyrrolidone and methacrylic acid at 71% hydration.

In the preferred embodiment the distance segment 20 of the lens is an optic of approximately 14 mm diameter and the reading segment 30 is an optic of approximately 7 mm diameter. The reading segment 30 is intergral with the distance segment 20 and positioned with respect thereto such that its optical axis 33 is located on, or near, the circumference of the distance segment 20. It will be seen that the lenses according to the embodiment in FIGS. 1–4 may be used for either the right or the left eye and thus function as either right hand or left hand lenses, since it is only their orientation on the cornea which is reversed.

Preferably, the optical properties of the reading portion 30 are such that it is between approximately +1 diopter and +4 diopters stronger than the distance portion 20.

Figure 5:
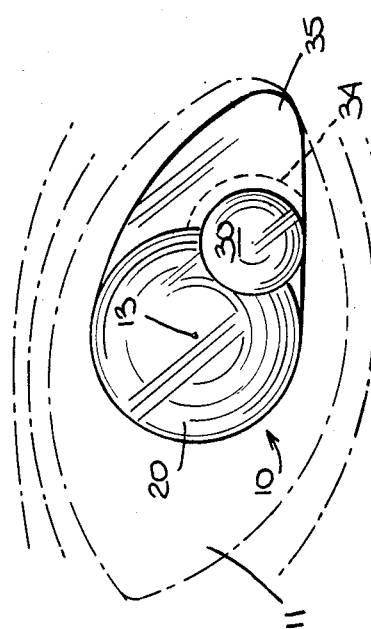
FIG. 5 is a front elevational view of another embodiment of the lens according to the present invention for use on the right eye of a person.

The rear surfaces 22 and 32 of the two lens segments 20 and 30, while they may be of different diameters, are both spherically shaped of the same radius of curvature as the cornea. While these radii may be drawn from the same center of curvature, which is also the center of curvature of the cornea, it is preferred to have the centers of curvature "a" and "b" offset from one another 2 or 3 millimeters, as shown in FIG. 4, so that if it is assumed that each of the segments 20 and 30 lies in a plane generally defined by its peripheral edge, these two planes will be slightly less inclined with respect to each other than they would be if both curvatures were drawn from the same center of curvature "a". This allows the edge of the lens segment 30 to extend around the full periphery of that segment and form an arcuate edge 9 between itself and lens segment 20 so that proper seating of the lens segment 30 on the cornea, as seen in FIG. 3, may be achieved. As a further aid to facilitate such seating, lens segment 30 may be formed with a marginal portion 34, seen in FIGS. 5 and 6, which extends around a part of the periphery of lens segment 30 and has a posterior surface which is spherical and acts as an extension of the posterior surface 32.

In use, one lens is positioned on the right eye with its distance portion 20 coaxial with the optical axis 13 of the eye as seen in FIGS. 1 and 2 and with its reading portion 30 in about the 4:30 o'clock position, i.e. directed toward the nose of the user. When it is desired to use the reading segment 30, the lens 10 is shifted to the left with respect to the cornea, moving the distance portion 20 off the axial position and replacing it on the optical axis 13 with the reading portion 30, as seen in FIGS. 3 and 4. The reading portion 30 properly seats on the cornea and holds the lens 10 in place while the distance portion of the soft plastic lens extends along and beyond the cornea 11 onto the sclera 12 as seen in FIGS. 3 and 4 and is held in that position by the seated reading portion 30. Due to the soft nature of the lens material the lens is able to adapt, at least partially, to the change of curvature of the sclera with respect to the cornea. Thus, while the inclination of the plane of segment 30 with respect to the plane of segment 20 accounts for some of the facility to so adapt, the softness of the lens material itself permits the portion extending onto the sclera, e.g. a part of portion 20 in FIG. 4, to at least partially adapt to the curvature of the scalera.

Figure 7:
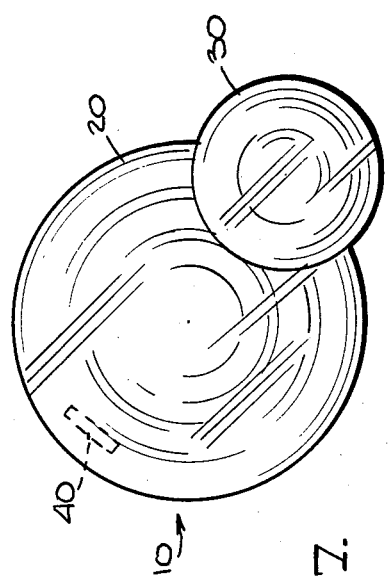
FIG. 7 is still another embodiment of the lens according to the present invention.

Movement of the lens from distance vision to reading vision i.e. from the FIG. 2 to the FIG. 4 positions thereof, or vice-versa, can be accomplished in a number of different ways. First, the user may, by placing his finger on the outer surace of the lens merely slide it over from the reading to the distance position, or vice versa. Alternatively, a magnet or magnetizable member 40, see FIG. 7, may be embedded in a peripheral portion of the lens 10. The user can then by moving an external member, for example, a magnet, near the lens, shift the position of the lens on the cornea. Preferably, however, the shape of the lens is such, see FIGS. 5 and 6, that without touching or approaching the lens with the fingers or any other external member, the user may, by merely shifting his eyeball to the right or to the left within its socket, cause the lens to be shifted from one of its said positions to the other. Under these circumstances the shifting is accomplished by the forces exerted on the lens by the respective corner of the eye into which the lens is forced as the eyeball shifts. According to the aforesaid embodiment of the invention, the lenses are formed as right hand (FIG. 5) and left hand (FIG. 6) lenses, respectively. Each lens has a tab portion 35 for facilitating the shifting movement of the lens just described. The tabs 35 are shaped to engage the corresponding corner of the eye and, by such engagement, with the eyeball shifting in the proper direction, cause the lens to shift from the far vision to the near vision position when desired.

Thus, the several aforenoted objects and advantages are most effectively attained. Although several somewhat preferred embodiments have been disclosed and described in detail herein, it should be understood that this invention is in no sense limited thereby and its scope is to be detemined by that of the appended claims.

What is claimed is:

1. A bi-focal contact lens of soft polymeric material comprising:
    a first lens portion having a posterior surface curved to fit the cornea of a patient to which the lens is applied with a tendency for said first lens portion to remain centered thereon, said first lens portion being powered on the anterior surface thereof for distance vision with respect to the cornea of the patient;
    a second lens portion integral with said first lens portion and having a posterior surface also curved to fit said cornea of said patient with a tendency for said second lens portion to remain centered thereon when it is applied to said cornea, said second lens portion being powered on the anterior surface thereof for near vision with respect to such cornea, said second lens portion being located with respect to said first lens portion such that part of said second lens portion extends into one quadrant of said first lens portion and the remainder of said second lens portion extends outwardly beyond the periphery of said first lens portion; and
    said lens being adapted to be shifted on the eyeball horizontally between a first position in which said first lens portion is seated on and centered with respect to said cornea and said second lens portion is horizontally spaced from the optical axis of said first lens portion and a second position in which said second lens portion is seated on and centered with respect to said cornea and said first lens portion is horizontally spaced from the optical axis of said second lens portion, said lens being adapted to be shifted horizontally between said first and second positions thereof by horizontal movement of the eyeball engaging said lens with a respective corner of the eye, and said lens being adapted to be only rotated about the optical axis of the seated one of said lens portions and not be shifted vertically, in response to up or down movement of the eyeball engaging said lens with an eyelid.

2. The bi-focal contact lens according to claim 1, wherein said second lens portion is approximately 7 mm in diameter and said first lens portion is approxiamtely 14 mm in diameter.

3. The bi-focal contact lens according to claim 1, wherein said first and second lens portions are formed as a unitary lens member.

4. The bi-focal contact lens according to claim 1, wherein the optical axis of said second lens portion is located approximately on the circumference of said first lens portion.

5. The bi-focal contact lens according to claim 1, wherein the optical power of said second lens portion is between approximately +1 diopter and +4 diopter stronger than the optical power of said first lens portion.

6. The bi-focal contact lens according to claim 1, wherein said lens further comprises a tab extending radially beyond the periphery of said second lens portion and adapted to contact the corner of the eye of the user when the eyeball is moved in the corresponding direction, so as to shift the lens from said first to said second position thereof.

7. The bi-focal contact lens according to claim 6, wherein said second lens portion is located on one side of the vertical line passing through the optical axis when viewing the lens from a location anteriorly of the anterior surface thereof.

8. The bi-focal contact lens aecording to claim 7, wherein said one side is the right side.

9. The bi-focal contact lens aoccording to claim 7, wherein said one side is the left side.

10. The bi-focal contact lens according to claim 1, further comprising magnet means, embedded in said lens, for shifting of the lens between such positions.

11. The bi-focal contact lens according to claim 1, in which said posterior surface of said second lens portion defines a continuous peripheral edge interfacing with said posterior surface of said first lens portion.

12. A bi-focal contact lens of soft polymeric material comprising:
    first lens portion having a posterior surface curved to fit the cornea of a patient to which the lens is applied with a tendency of said first lens portion to remain centered thereon, said first lens portion having a given optical power and being sufficiently resilient to at least partly adapt itself to the eyeball surface which it covers when said second portion is seated on and centered with the cornea and to return to its original shape when it is seated on and centered with the cornea;
    a second lens portion integral with said first lens portion and having a posterior surface also curved to fit said cornea of said patient with a tendency for said second lens portion to remain centered thereon when it is applied to said cornea, said second lens portion having a given optical power different from that of said first lens portion; said second lens portion being located with respect to said first lens portion such at least part of said second lens portion extends into said first lens portion and being sufficiently resilient to at least partly adapt itself to the eyeball surface which it covers when said first lens portion is seated on and centered with the cornea and to return to its original shape when it is seated on and centered with the cornea, and
    said lens being constructed and configured such that said lens is adapted to be shifted horizontally on the eyeball between a first position in which said first lens portion is seated on and centered with respect to said cornea and a second position in which said second lens portion is seated on and centered with respect to said cornea, said lens being adapted to be shifted horizontally between said first and second positions thereof by horizontal movement of the eyeball engaging said lens with a respective corner of the eye, and said lens being adapted to be only rotated about the optical axis of the seated one of said lens portions and not be shifted vertically, in response to up or down of the eyeball engaging said lens with an eyelid.

13. A bi-focal contact lens according to claim 12 in which the distance between the optical axes of said first and second lens portions and the radii of said first and second lens portions are chosen such, in relation to the normal spacing of the eyelids, that said lens portions will not be vertically aligned when seated on the eye.

* * * * *

UNITED STATES PATENT AND TRADEMARK OFFICE
CERTIFICATE OF CORRECTION

PATENT NO. : 4,728,182

DATED : March 1, 1988

INVENTOR(S) : Charles D. Kelman

It is certified that error appears in the above-identified patent and that said Letters Patent is hereby corrected as shown below:

Column 6, claim 2, line 1, delete "approxiamtely" and substitute therefor --approximately--.

Column 6, claim 12, line 58, after "such" insert --that--.

Signed and Sealed this

Twelfth Day of July, 1988

Attest:

DONALD J. QUIGG

*Attesting Officer*  *Commissioner of Patents and Trademarks*